Jan. 15, 1963 A. W. CHEWNING ET AL 3,073,890
SPREADER FOR DISTRIBUTION SECONDARY CONDUCTORS
Filed July 24, 1961
2 Sheets-Sheet 1
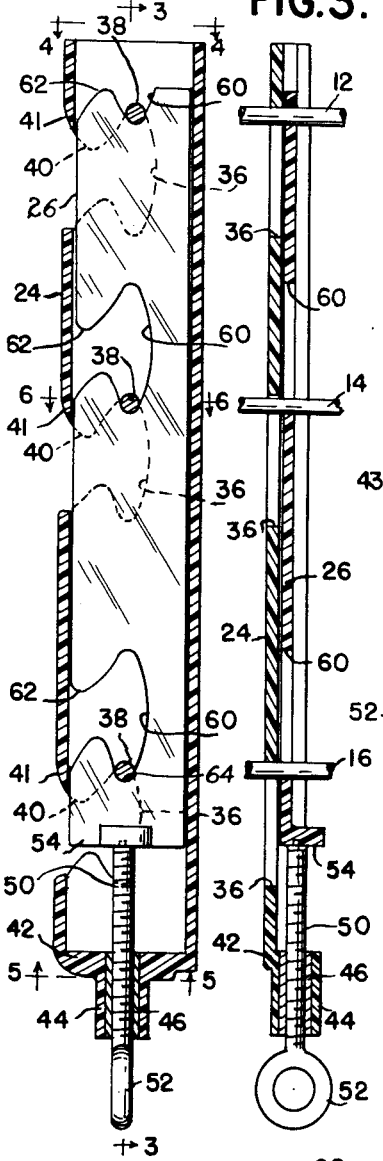
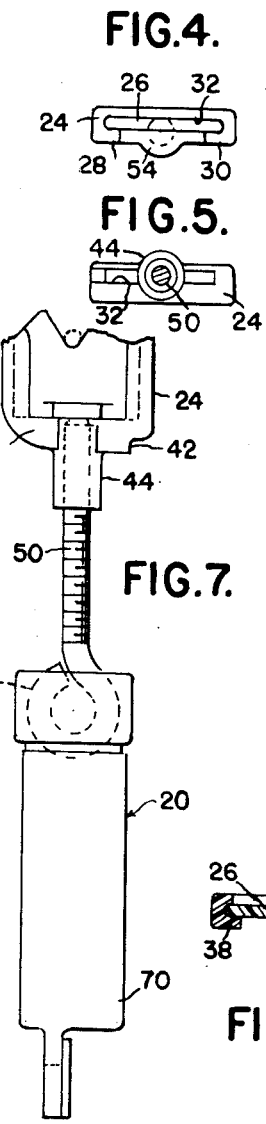
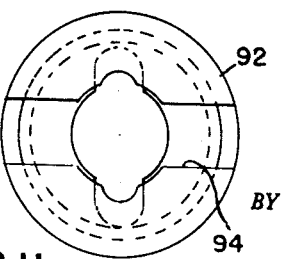
FIG.2. FIG.3. FIG.4. FIG.5. FIG.7. FIG.6. FIG.1. FIG.9. FIG.11.
INVENTORS
ARTHUR W. CHEWNING
REX L. HAASE
RICHARD E. STEPHENS
BY Whittemore, Hulbert & Belknap
ATTORNEYS

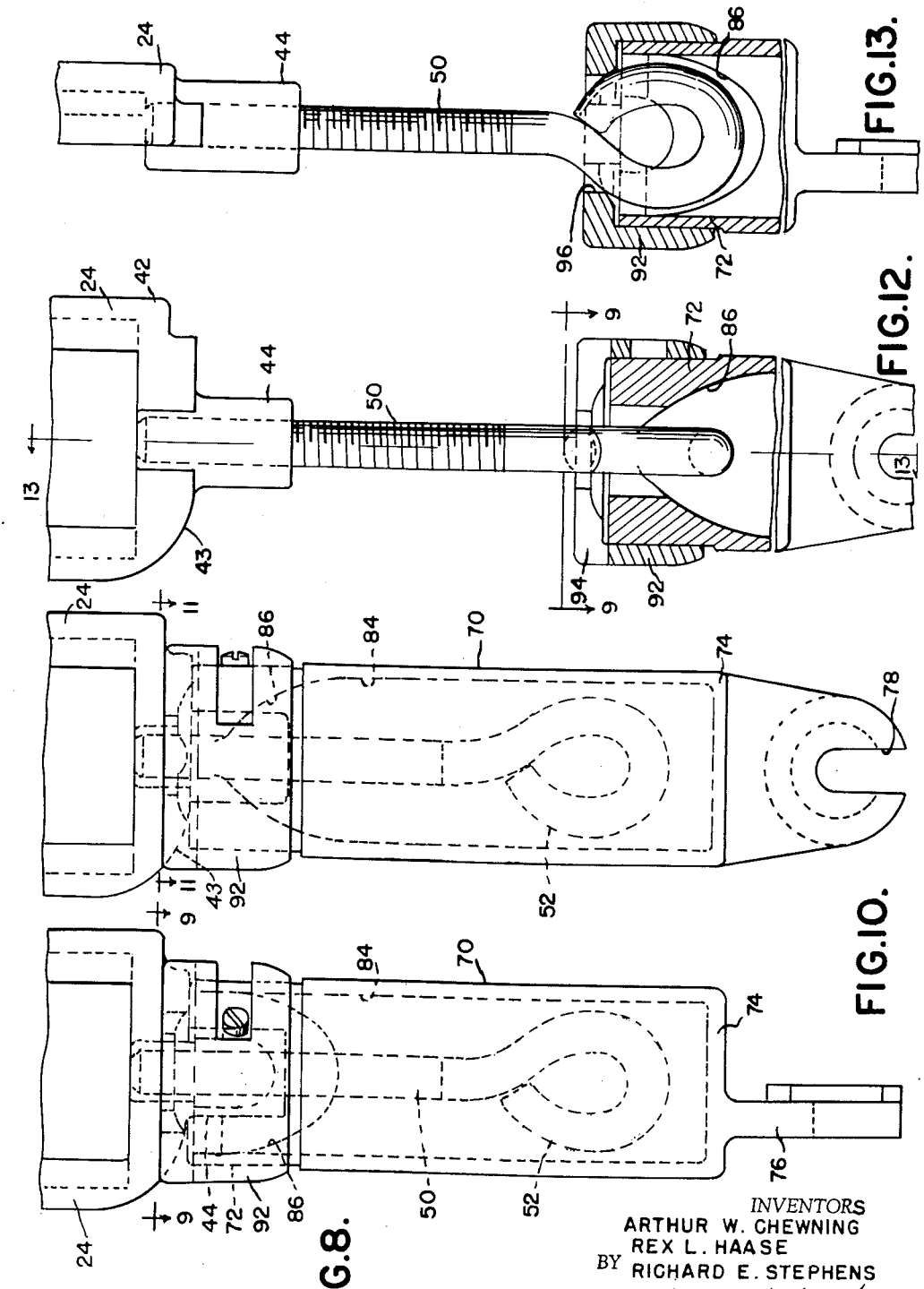

United States Patent Office 3,073,890
Patented Jan. 15, 1963

3,073,890
SPREADER FOR DISTRIBUTION SECONDARY CONDUCTORS
Arthur W. Chewning and Rex L. Haase, Royal Oak, and Richard E. Stephens, Farmington, Mich., assignors to The Detroit Edison Company, Detroit, Mich., a corporation of New York
Filed July 24, 1961, Ser. No. 126,215
3 Claims. (Cl. 174—146)

This invention relates to a spreader for overhead secondary distribution conductors or cables. More particularly, this invention relates to a spreader to be applied to overhead cables with an actuating tool utilized at ground level.

Spreaders are utilized to hold bare secondary conductors apart. The purposes of the spreaders are to maintain separation on secondary conductors between poles in order to prevent the conductors from becoming crossed or resulting in short circuits and to eliminate the need of conductor replacement when the weatherproof covers on the conductors have worn. In addition, the spreaders eliminate the need of covered line conductors on secondary voltages. In the past, the aforementioned spreaders have been directly applied to the secondary conductors by hand.

The spreaders were manually applied to the secondary conductors with the help of a ladder wagon in which the ladder was raised or lowered with respect to the overhead secondary conductors. This manner of installing the spreaders has certain deficiencies since conditions exist in many areas where the secondary conductors or cables are located on easements which are not readily accessible with a ladder truck. Extension ladders were also utilized but were not successful in actual practice.

The present invention has eliminated the use of ladder trucks, extension ladders or the like by providing a spreader which is adapted to be installed on overhead cables and clamped in place thereon by means of an actuating tool operable by a person on the ground.

It is an object of the present invention to provide a spreader for electrical cables comprising a bracket having a plurality of spaced cable gripping surfaces, a slide within said bracket having a like plurality of spaced cable gripping surfaces which overlie the gripping surfaces in the bracket when the spreader is opened to form openings which are adapted to receive cables and means for moving the slide relative to the bracket to close the aforesaid openings and encircle and retain the cables between the aforesaid gripping surfaces.

Another object of the present invention is to provide a spreader of the type just described wherein said means include an adjustment screw which is threaded to the bottom of the bracket and has an end in juxtaposition to the bottom surface of the slide.

Still another object of the present invention is to provide a spreader of the aforementioned type in combination with an actuating tool which is operated by a person on the ground for installing the spreader on overhead cables.

A further object of the present invention is to provide a spreader of the type previously described wherein the threaded adjustment screw is adapted to be connected to a hot-stick tool which is operated manually from the ground for actuating the adjustment screw and installing the spreader on overhead cables.

Other objects and features of the invention will become apparent as the description proceeds, especially when taken in conjunction with the accompanying drawings, illustrating a preferred embodiment of the invention, wherein:

FIGURE 1 is a perspective view showing the spreader installed between a plurality of overhead cables and the actuating tool connected to the spreader.

FIGURE 2 is a partial sectional elevational view through the spreader.

FIGURE 3 is a vertical sectional view taken on line 3—3 of FIGURE 2.

FIGURE 4 is a top view looking in the direction of arrows 4—4 of FIGURE 2.

FIGURE 5 is a bottom view looking in the direction of arrows 5—5 of FIGURE 2.

FIGURE 6 is a sectional view looking in the direction of arrows 6—6 of FIGURE 2.

FIGURE 7 is a fragmentary elevational view illustrating the first step for connecting the clamping tool to the spreader.

FIGURE 8 is a fragmentary elevational view illustrating the second step for connecting the clamping tool to the spreader.

FIGURE 9 is a top view of the open end of the tool clamp looking in the direction of arrows 9—9 of FIGURE 8.

FIGURE 10 is a fragmentary elevational view illustrating the clamping tool turned 90 degrees with respect to the spreader.

FIGURE 11 is a top view of the open end of the clamping tool with its housing rotated 90 degrees with respect to the bushing, so as to lock the tool to the spreader, and looking in the direction of arrows 11—11 of FIGURE 10.

FIGURE 12 is a fragmentary elevational view, partly in section, illustrating the position in which the tool clamp is rotated so as to effect movement of the slide of the spreader.

FIGURE 13 is a side view, partly in section, taken along the lines 13—13 of FIGURE 12.

The spreader is best illustrated in an assembled position in FIGURE 1 and is designated by the numeral 10. The spreader is mounted between overhead secondary conductors or cables 12, 14 and 16 which are spaced apart and maintained in spaced relationship by the spreader 10. The spreader 10 is made from non-conducting material in order to prevent a short circuit between adjacent conductors. The spreader 10 is adapted to be inserted between the conductors in the manner illustrated in FIGURE 1 by means of an actuating or clamping tool 18 which comprises a tool clamp 20 and a hot stick or rod 22 made from a non-conducting or insulated material. Generally the stick 22 is made from glass fibers bonded together. The glass fibers may be of the type sold under the trade-name "Fiberglass." The tool clamp 20 is adapted to be connected to the actuating portion of the spreader 10 in a manner to be subsequently described.

The spreader 10 consists of an elongated bracket 24 and slide 26. The bracket 23 and slide 26 are made from non-conducting material such as from a plastic material. The bracket 24 has a pair of inwardly turned longitudinally extending flanges 28 and 30, as best illustrated in FIGURE 4, which define a slide cavity 32 which receives the slide 26. The flanges 28 and 30 retain the slide 26 in the bracket 24.

The bracket 24 is provided with three sets of elliptically shaped openings 36 which have their longest axes coincidental with the longitudinal axis of the bracket 24. The openings 36 provide gripping surfaces 38 which are used for a purpose to be hereinafter described. The bracket 24 is provided with laterally extending slots 40 which engage one side of the openings 36 and terminate at the longitudinal edge of the bracket 24 as is indicated at 41.

The lower end of the bracket 24 has a bottom 42 which is shaped to provide a key 43. The key 43 is used for a purpose to be hereinafter described. The bottom 42 has a cylindrically shaped boss 44 extending downwardly therefrom. The boss 44 is provided with an internally threaded brass bushing 46 which is adapted to receive a threaded eye-bolt 50 in such a manner that the eye-shaped head 52 of the bolt 50 extends beyond the end of the boss 44. The threaded eye-bolt 50 has its threaded end abutting the lower end 54 of the slide 26 so that adjustment of the eye-bolt 50 raises or lowers the slide 26 with respect to the bracket 24.

The slide 26 is provided with elliptically shaped openings 60 which have their axes coincidental with the longitudinal axis of the slide 26. Laterally extending slots 62 are provided in one edge of the slide 26 so as to provide an opening for the elliptically shaped openings 60. The openings 60 provide gripping surfaces 64 which cooperate with the gripping surfaces 38 of the bracket 24 to retain cables therebetween. The slide 26 is constructed and arranged so that the openings 60 and slots 62 coincide with the openings 36 and slots 40 provided in the bracket 24 when the spreader 10 is in an open position.

As previously mentioned, the means for opening and closing the spreader 10 includes the tool clamp 20 which is carried at one end of the hot stick 22. The clamp 20 is provided with a tubular housing 70 which is open at one end 72 and closed at the other end 74 as is best illustrated in FIGURES 8 and 10. The closed end 74 has a downwardly extending flange 76 which is provided with an elongated U-shaped opening 78. The hot stick 22 is provided with a flange 80 on one end thereof which is connected to the flange 76 by an appropriate fastening arrangement 82 as illustrated in FIGURE 1.

The tool clamp 20 is constructed and arranged in a novel manner. The housing 70 has a bore 84 which has a diameter greater than the width of the eye-shaped head 52 of the bolt 50. The bore 84 of the housing 70 is reduced in diameter at the open end 72, as is best illustrated in FIGURES 12 and 13, so as to provide an opening or a cavity 86 having a clover-leaf configuration as viewed in FIGURE 9.

The opening 86 is symmetrically arranged about the longitudinal axis of the housing 70. The opening 86 measured along its major axis 88 has a length greater than the width of the eye-shaped head 52. The opening 86 has a width measured along the minor axis 90 which is less than the width of the head 52. FIGURES 12 and 13 clearly illustrate the contour and depth of the opening 86 along vertical planes. The upper end 72 of the housing 70 is provided with a lock bushing 92 which has an elongated slot 94 which has a length greater than the width of the eye-shaped head 52. Relative motion is permitted between the bushing 92 and housing 70 for a purpose to be subsequently described. The slot 94 is enlarged at 96 to a width which is still less than the width of the eye-shaped head 52.

In operation, the hot stick 22 is appropriately connected to the tool clamp 20 on the ground. The bushing 92 is arranged on the open end 72 of the housing 70 in the position indicated in FIGURE 9 so that the elongated slot 94 provided in the bushing 92 overlies the major axis 88 of the opening 86 provided in the housing 70. After the tool clamp 20 has been oriented in the manner just described, the tool clamp 20 is moved from the position illustrated in FIGURE 7 to the position illustrated in FIGURE 8 so that the eye-bolt 50 is moved into the interior of the housing 70. Simultaneously, the boss 44 is moved into the cavity 86 while the key 43 is received by the slot 94 provided in the bushing 92.

The hot stick 22 is then rotated 90 degrees so as to rotate the tool housing 70 with respect to the bushing 92 and the spreader 10. The bushing 92 is prevented from rotating because of its engagement with the key 43 provided on the bottom of the spreader 10. With the tool clamp 20 turned 90 degrees to the position illustrated in FIGURE 10, the eye-shaped head 52 of the bolt 50 is locked in the housing 70 so that the tool clamp 20 may not be removed from the spreader 10 unless the above-described procedure is reversed.

After the tool clamp housing 70 has been oriented so as to lock the eye-shaped head 52 therein, the tool clamp 20 and rod 22 are moved away from the spreader 10 to the position illustrated in FIGURES 12 and 13. A continued downward pull on the rod 22 will urge wall portions of the bushing 92 and the housing 70 into engagement with the eye-shaped head 52 of the bolt 50 so that rotation of the rod 22 and tool clamp 20 will rotate the bolt 50 and effect linear movement of the slide 26 with respect to the bracket 24 so as to open or close the openings in the spreader as required.

After the tool clamp 20 is rotated in a direction to close the openings which retain cables therebeween, it is necessary to remove the tool clamp 20 and rod 22 from the eye-bolt 50. All that is required is that the tool clamp housing 70 be moved from the position illustrated in FIGURES 12 and 13 to the position illustrated in FIGURE 10, after which time the housing 70 is rotated 90 degrees with respect to the bushing 92 and the spreader 10 so as to align the slot 94 with the major axis 88 of the opening 86 as indicated in FIGURE 9. After this has been accomplished, the tool clamp 20 and rod 22 are removed from the eye-bolt 50 by an endwise motion.

The drawings and the foregoing specification constitute a description of the improved spreader for distribution secondary conductors in such full, clear, concise and exact terms as to enable any person skilled in the art to practice the invention, the scope of which is indicated by the appended claims.

What we claim as our invention is:

1. A permanently mounted spreader for holding a plurality of vertically spaced overhead cables in vertically spaced relationship comprising an elongated bracket made from a non-conducting material, said bracket having a base, the longitudinal edges of which are bent laterally in the same direction and reversely in the opposite direction to provide a pair of retaining flanges which are spaced from said base, said base including a plurality of longitudinally spaced cable gripping surfaces having entrances at one longitudinal edge thereof, an elongated slide made from a non-conducting material and located within the space between said base and said flanges and held against substantial lateral movement by said base and the aforesaid longitudinal edges, said slide having a like plurality of longitudinally spaced cable gripping surfaces having entrances at one longitudinal edge thereof, said slide entrances and gripping surfaces overlying the entrances and gripping surfaces in said base respectively when the spreader is open to form longitudinally spaced openings which are adapted to receive said cables, and a remote controlled adjustment screw threaded to the bottom of said bracket and having its leading end in juxtaposition to the bottom of said slide for moving the slide lengthwise with respect to said bracket to close the aforesaid openings and thereby encompass and retain the cables between the aforesaid gripping surfaces, the spreader when mounted being supported entirely by the cables.

2. A spreader defined in claim 1 wherein the ends of said flanges are spaced laterally apart.

3. A spreader defined in claim 2 wherein the bottom of said slide is provided with a laterally extending lug movable within the space between and spaced from the ends of said flanges, and said adjustment screw having its leading end in direct contact with the lower surface of said lug.

References Cited in the file of this patent

UNITED STATES PATENTS

| | | |
|---|---|---|
| 1,188,972 | Moffat | June 27, 1916 |
| 1,274,594 | Randolph | Aug. 6, 1918 |
| 2,339,181 | Martin | Jan. 11, 1944 |
| 2,791,335 | Leebow | May 7, 1957 |

(Other references on following page)

| | UNITED STATES PATENTS | |
|---|---|---|
| 2,899,160 | Sher et al. | Aug. 11, 1959 |
| 2,976,344 | Bethel | Mar. 21, 1961 |
| 3,005,609 | Joffe | Oct. 24, 1961 |
| | FOREIGN PATENTS | |
| 247,693 | Great Britain | Feb. 25, 1926 |
| 775,828 | Great Britain | May 29, 1957 |

OTHER REFERENCES

Catalogue: Electrical Live Line Equipment, published by Tips Tool Company, Inc., Taylorville, Illinois, Catalog No. 6, December 1933, pages 35 and 58 relied on.